(No Model.) 2 Sheets—Sheet 1.
A. M. NEEPER.
ELECTRICAL CONDUCTOR FOR RAILWAYS.
No. 307,791. Patented Nov. 11, 1884.
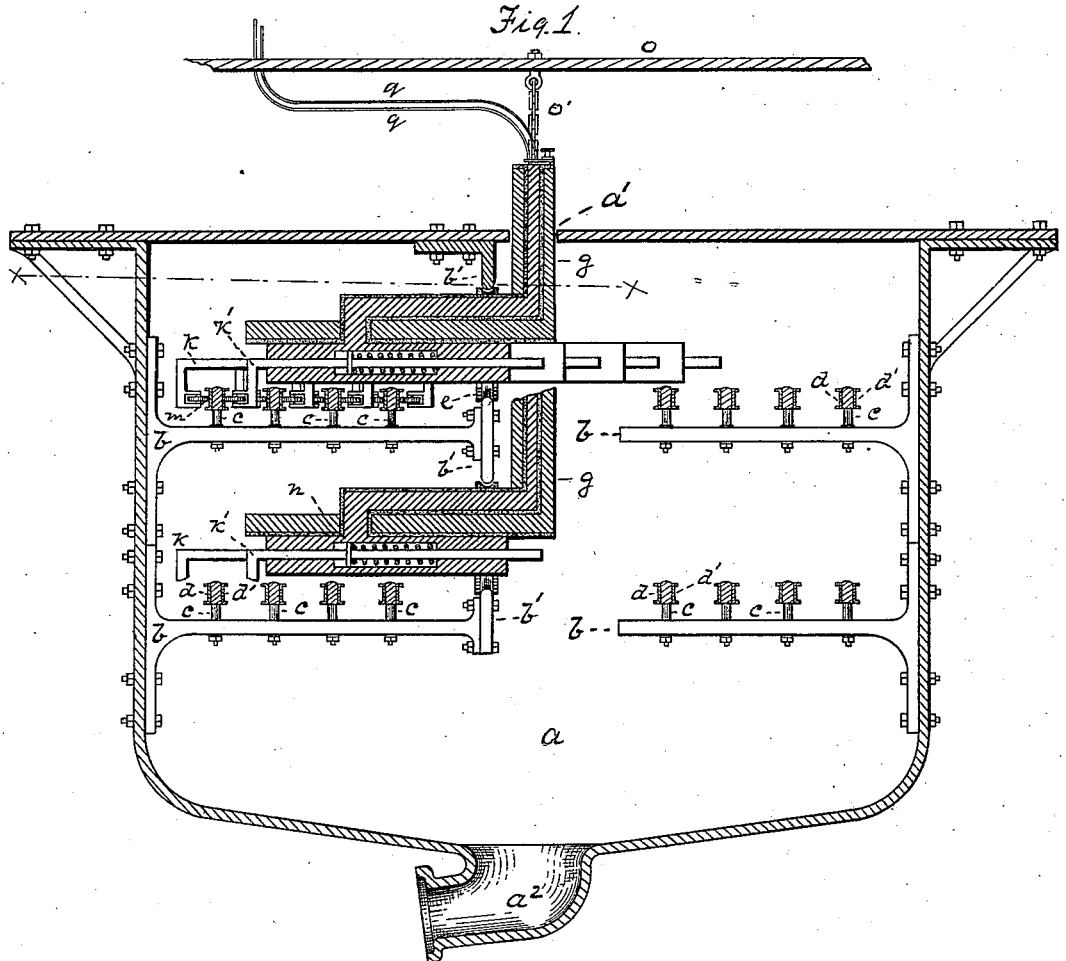

(No Model.)  2 Sheets—Sheet 2.
A. M. NEEPER.
ELECTRICAL CONDUCTOR FOR RAILWAYS.
No. 307,791. Patented Nov. 11, 1884.
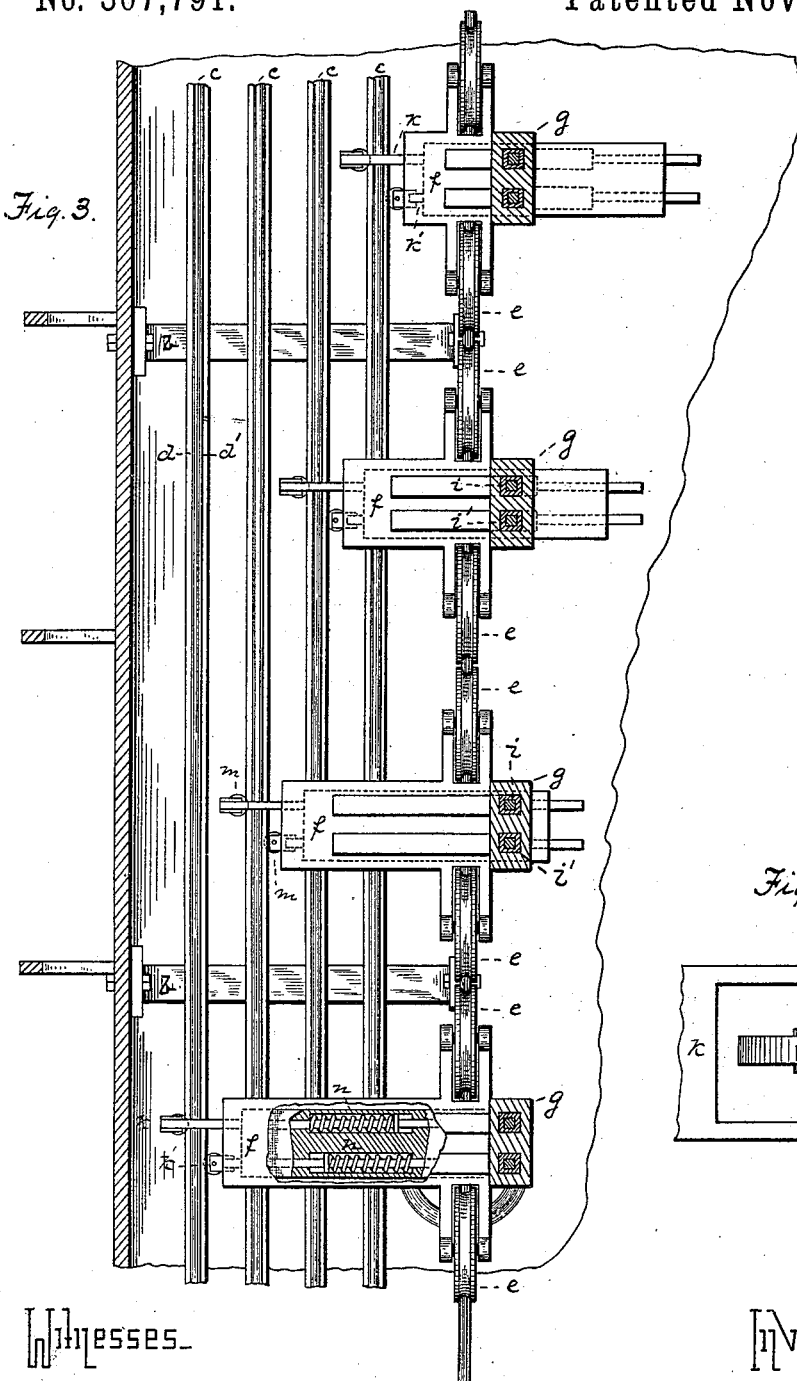
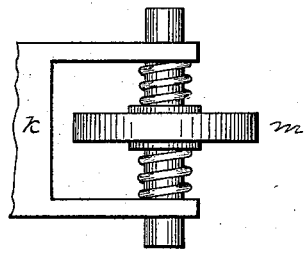

UNITED STATES PATENT OFFICE.

ALEXANDER M. NEEPER, OF PITTSBURG, PENNSYLVANIA.

ELECTRICAL CONDUCTOR FOR RAILWAYS.

SPECIFICATION forming part of Letters Patent No. 307,791, dated November 11, 1884.

Application filed June 14, 1884. (No model.)

*To all whom it may concern:*

Be it known that I, ALEXANDER M. NEEPER, of Pittsburg, in the county of Allegheny and State of Pennsylvania, have invented a new and useful Improvement in Electrical Conductors for Railways; and I do hereby declare the following to be a full, clear, and exact description thereof.

My invention relates to an improvement in electrical conductors for applying electricity as a motive power to street-cars; and it consists in the arrangement and construction of devices as hereinafter specified.

I will now describe my invention so that others skilled in the art may employ the same, reference being had to the accompanying drawings, forming part of this specification, in which—

Figure 1 is a vertical cross-section through the trough-conductors and traveler. Fig. 2 is a vertical section through the conductors, showing a portion of the traveler connected therewith. Fig. 3 is a horizontal section through the trough on the line $x\,x$, Fig. 1; and Fig. 4 is a detached view of one of the contact-wheels on the traveler.

Like letters of reference indicate like parts wherever they occur.

In the system of conveying electricity employed by me there is a central station in which are any required number of dynamo-machines—one for each car on the road—and on each car is also a dynamo-machine. These dynamos—one at the central station and the other on each car—are connected with each other by my improved electrical circuit, composed of a pair of conductors—one positive and the other negative—which communicate with the dynamo on the car through my improved traveler. To each car there is a separate circuit of two conductors.

In the drawings, $a$ represents a trough placed under ground between the rails of the track. This trough is preferably composed of iron, although it may be formed of any suitable material, and in the upper plate of which is a longitudinal slot or opening, $a'$, for the passage of the traveler. The upper plate of this trough is secured to flanges on the body of the trough by bolts and braces, as shown in the drawings, so that access may be had at any time to the interior of the trough by removing the plate.

Bolted to the sides of the trough $a$ on each side thereof are one or more longitudinal plates, $b$, secured to which are suitable standards or rails, $c$, on each side of which are secured the conductors $d\,d'$. These plates $b$ may be arranged one above the other, forming shelves on each side of the trough $a$, leaving a central passage between them beneath the slot $a'$ for the passage of the traveler.

The conductors $d\,d'$ are composed, preferably, of strips of copper, which are attached to each side of the rail $c$, which is formed of wood or other non-conducting material, the strip $d$ forming the positive conductor and the strip $d'$ the negative conductor, each of which is connected with the dynamo-machine at the central station, and the two conductors forming a circuit for one of the cars. There should be a separate circuit arranged in the manner described on the shelves $b$ for each car on the road. These copper conductors $d\,d'$ may be of any suitable form, either having a flat surface, as at $x$, Fig. 2, or a semi-oval surface, as at $y$, Fig. 2, the contact-wheels of the traveler being formed to correspond.

In the bottom of the trough $a$, at suitable intervals, are outlet-pipes $a^2$, which communicate with the sewers, so as to drain the trough and enable it to be cleaned by introducing water therein through suitable water-supply pipes. Each of the circuits on the rails $c$ is connected with the dynamo on the street-car by a traveler. This traveler is composed of two grooved wheels, $e$—one in front of the other—traveling on and between the vertical plates $b'\,b'$, secured to the top plate of the trough $a$ and the end of the plates $b$. These wheels $e$ are journaled in a frame on the body of the carriage or traveler $f$, which extends at right angles to the line of the supports $c$ over the conductors $d\,d'$.

Extending from the body $f$, midway between the wheels $e\,e$, is an upright plate, $g$, fixed to the body $f$ and passing through the slot $a'$. In this plate $g$ are openings extending from the top to the bottom of the plate, in which openings are two conductors, $i\,i'$.

Within the frame or body $f$ are secured two sliding metal bars, $k\,k'$, the outer ends of which bend down, one on each side of one of the rails c. Journaled in these ends of the rods or bars k k' are traveling contact-wheels m, which are formed of metal and bear against the strips d d on the rail c. To prevent these wheels from being separated from the conductors d d, and at the same time allowing sufficient freedom to the carriage to permit it to pass curves, springs n n are placed within the frame f, one of which draws on the bar k, while the other pushes on the bar k'. The conductors i i' are connected with the rods k k'. The different parts of the carriage or travelers f are insulated from the rods k k' and conductors i i'. This traveler is connected with the car o by chains o', and the conductors i i' are connected with the dynamo on the car by flexible conductors q q. There may be as many travelers as there are cars and circuits c, a separate traveler being required for each circuit and car.

Although I have shown in the drawings four shelves b, on each of which are arranged four circuits c, I do not desire to limit myself to any number. The trough a may be placed underground between the rails of the street-car tracks, or between the two tracks, as is desired. In the latter case cars passing each other on opposite tracks change travelers with each other, and by adjusting the commutator the movement of the traveler is reversed, the traveler being connected to any desired part of the car by the chains o. Instead of the chains o, a spring-bar may be employed.

The advantages of my invention are, any number of cars may be used on the road, each being propelled separately from the other. By means of the connection between the travelers and cars separate from the flexible conductors, the difficulty arising from the swaying motion of the cars is obviated.

Owing to the form of the underground trough, access may be easily had to the conductors should they need to be repaired or changed.

Having thus described my invention, what I claim, and desire to secure by Letters Patent, is—

1. A system of electrical circuits for propelling railway-cars, consisting of a series of insulated conductors arranged parallel to each other in a trough or case, so as to form a number of circuits, each circuit having a positive and negative conductor, in combination with travelers, each of which is connected with the two conductors, so as to close the circuit, substantially as and for the purpose specified.

2. In a system of underground circuits for propelling cars, the combination of a longitudinally-slotted trough or case having parallel insulated conductors arranged therein to form a circuit for the positive and negative currents of electricity, an independent traveler rail, and a traveler, substantially as and for the purposes specified.

3. In a system of electrical circuits for propelling railway-cars, a traveler consisting of a frame mounted on suitable wheels, said frame having separate insulated conductors arranged therein for the positive and negative current, in combination with a circuit having positive and negative conductors, and an independent traveler rail or track, substantially as and for the purpose specified.

4. In a system of electrical circuits for propelling railway-cars, a traveler having the L-shaped frame or carriage, the sliding connecting bars or conductors k k', and springs n n', in combination with the positive and negative conductors of an electric circuit, substantially as and for the purpose specified.

5. In a system of electrical circuits for propelling railway-cars, a traveler mounted on a suitable way or track in an underground trough or case, and connected with the car by a flexible chain or bar, in combination with a flexible conductor, substantially as and for the purpose specified.

6. In a system of electrical circuits for propelling cars, a longitudinally-slotted trough or case having shelves or supports upon which are mounted a series of independent or detached parallel bars having conductors secured thereto, said shelves being so arranged as to afford a space for the passage of travelers connecting with the conductors, substantially as and for the purpose specified.

7. The longitudinally-slotted trough a, having shelves b, independent standards c, and conductors d d', arranged substantially as and for the purpose specified.

8. In a system of electrical circuits for propelling cars, a longitudinally-slotted trough or case having lateral rail-supports provided with standards, insulated conductors secured to said standards, traveler-rails, and a traveler having a laterally-projecting frame provided with spring-conductors adapted to engage with the insulated conductors of the trough, substantially as and for the purposes specified.

In testimony whereof I have hereunto set my hand this 9th day of June, A. D. 1884.

ALEXANDER M. NEEPER.

Witnesses:
W. B. CORWIN,
JAMES V. BAKEWELL.